Patented Sept. 14, 1954

2,689,228

UNITED STATES PATENT OFFICE 2,689,228

POLYMERIZABLE COMPOSITIONS COMPRISING AN ALDEHYDE-REACTION PRODUCT OF AN UNSATURATED GUANAMINE AND POLYMERIZATION PRODUCTS THEREOF

Walter M. Thomas, Springdale, Conn., assignor to American Cyanamid Company, New York, N. Y., a corporation of Maine No Drawing. Application July 18, 1952,
Serial No. 299,746

11 Claims. (Cl. 260—2.1)

This invention relates to the production of new materials having valuable and characteristic properties that make them especially suitable for use in industry, for example in molding coating, laminating, adhesive, textile-treating, paper-treating and other applications. More particularly the invention is concerned with polymerizable compositions comprising a polymerizable product of reaction of ingredients comprising (1) an aldehyde (including polymeric aldehydes, hydroxyaldehydes and aldehyde-addition products) and (2) an amidogen compound represented by the general formula

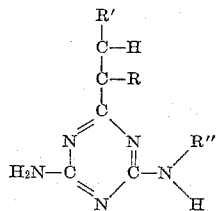

where R represents the methyl radical except when R' represents the phenyl radical in which case R represents hydrogen, R' represents a member of the class consisting of hydrogen and the phenyl radical, and R'' represents a member of the class consisting of hydrogen and alkyl, aralkyl and aryl radicals. The polymerizable compositions include the aforementioned polymerizable reaction product and one or more other substances which are different therefrom and copolymerizable therewith, e. g., a different compound containing a $CH_2=C<$ grouping, or both an unsaturated alkyd resin and said different compound containing a $CH_2=C<$ grouping, as well as other types of copolymerizable reactants. The scope of the invention includes copolymers produced from the aforementioned polymerizable compositions, as well as method features.

Illustrative examples of radicals represented by R'' in the above formula are alkyl (including cycloalkyl), e. g., methyl to octadecyl, inclusive, and the various isomeric forms thereof, cyclopentyl, cyclohexyl, cycloheptyl, etc.; aralkyl, e. g., benzyl, phenylethyl, phenylpropyl, etc., and aryl (including alkaryl), e. g., phenyl, diphenyl, biphenylyl or xenyl, tolyl, xylyl, ethylphenyl, etc.

Illustrative examples of amidogen compounds, more particularly unsaturated guanamines, embraced by the above formula are methacryloguanamine, cinnamoguanamine, and N-phenylmethacryloguanamine. Other examples will be apparent to those skilled in the art from the aforementioned general formula and the definitions of R, R' and R'' and from the numerous illustrative examples, hereinbefore given, of alkyl, aralkyl and aryl radicals represented by R'' in the said formula.

The unsaturated guanamines used in carrying the present invention into effect are prepared by known methods, for example as disclosed and claimed in Patent No. 2,462,943, dated February 15, 1949. In general, these alpha,beta-unsaturated guanamines are produced by effecting reaction between biguanide or a 1-substituted biguanide and an ester of an alpha,beta-unsaturated aliphatic carboxylic acid.

It was known prior to my invention that resinous compositions could be prepared by effecting reaction between ingredients including (1) an aldehyde and (2) an aminotriazine having an unsaturated grouping, specifically an alloxy radical, attached to a carbon atom in the triazine ring. Examples of such aminotriazines are 2-alloxy-4,6-diamino-1,3,5-triazine and 2-amino-4,6-dialloxy-1,3,5-triazine, and the aldehyde-reaction products of which are more fully described in, for example, Kropa Patent No. 2,496,097. Such resinous materials are valuable for many industrial and other applications but their field of utility is somewhat limited because of the tendency of the unsaturated grouping to be sluggish in its rate of polymerization when it is desired to form homopolymers of the polymerizable aminotriazine or copolymers thereof with other copolymerizable monomers.

The present invention is based on my discovery that a new class of synthetic materials having particular and peculiar properties that make them especially valuable for use in industry can be prepared as briefly described in the first paragraph of this specification and more fully hereinafter. The ethylenically unsaturated grouping attached to the 2-carbon atom of the triazine ring provides a point through which reaction can take place with other copolymerizable substances, and also imparts to the aminotriazine better solubility characteristics than that of many other aminotriazines, e. g., melamine. Furthermore, the amino groups containing hydrogen attached to the nitrogen thereof are reactive with aldehydes, e. g., formaldehyde. When the aldehyde is formaldehyde the corresponding monomethylol or polymethylol derivative (or mixtures thereof) is formed, and the methylol derivative then can be caused to condense with itself to form a condensation polymer. This condensation polymerization can be caused to occur concurrently with a copolymerization reaction through the ethylenically unsaturated grouping of the unsaturated guanamine, e. g., by forming copolymers thereof with an unsaturated alkyd resin, e. g., diethylene glycol fumarate, triethylene glycol maleate sebacate, etc., a compound containing a $CH_2=C<$ grouping which is different from the aldehyde-reaction product of the unsaturated guanamine, numerous examples of which have been given hereinbefore. Combinations of these two types of reactions provide a large number of new and novel compositions which are useful as molding compounds, surface-coating materials (or as components thereof), for treating paper, textiles and other materials to improve their useful properties, as ion-exchange resins, etc.

The thermosetting or potentially thermosetting resins of this invention have considerable hardness and/or toughness in thermoset or cured state. These properties can be varied as desired or as conditions may require by appropriate choice of the aldehyde and unsaturated guanamine reactants, the reaction conditions and the other unsaturated material, if any, with which the polymerizable aldehyde-reaction product of the unsaturated guanamine subsequently is copolymerized. The present invention also provides polymerization products having excellent electrical properties, e. g., high resistance to arcing. The filled and unfilled resins of this invention also show less "after-shrinkage" than similar resins which cure solely by a condensation reaction. Resinous materials having a good color in cured state also are produced by practicing the present invention.

Taking formaldehyde as illustrative of the aldehyde it may be mentioned that one mole of neutral, aqueous formaldehyde will combine, in the absence of a catalyst, with one mole of methacryloguanamine, or other unsaturated guanamine of the kind embraced by the general formula given in the first paragraph of this specification, to give a monomethylol derivative. When heated under conditions such that water is removed continuously, the product condenses with itself to give a thermoplastic linear polymer. The reaction of one mole of the unsaturated guanamine with two or more moles of formaldehyde also occurs readily, preferably under alkaline conditions, to give clear, water-soluble products. If such products are then heated at an elevated temperature, e. g., 125°–150° C., hard resins are produced that are soluble initially in water-alcohol mixtures but which pass, on further heating and elimination of water, to a substantially insoluble, substantially infusible state. In general, the uncured, low-molecular-weight guanamine-aldehyde, specifically guanamine-formaldehyde, resins of this invention, especially those that have been prepared in alkaline solution, have good compatibility characteristics with, for example, water, water-alcohol mixtures, monoethyl ether of ethylene glycol and aqueous acids, e. g., dilute hydrochloric, phosphoric, formic and acetic acids. The uncured guanamine resins of this invention that can be polymerized by a conjoint condensation and addition reaction to high-molecular-weight bodies can be cured while admixed with, for example, polyvinyl alcohol, the various polyvinyl acetals (e. g., polyvinyl formal, polyvinyl acetal, polyvinyl butyral, etc.), certain polyesters and polyamides (e. g., polyepsilon-caprolactam), various thermosetting or heat-curable (heat-convertible) amidogen-aldehyde resins, e. g., the curable melamine-formaldehyde resins, alkylated (specifically, methylated) melamine-formaldehyde resins, urea-formaldehyde resins, etc., yielding homogenous or substantially homogeneous cured resinous masses characterized by good compatibility between the components of the blend. Advantage can be taken of such compatibility characteristics in producing improved adhesive, laminating, surface-protective and other resinous compositions containing a substantial proportion of a conventional resin, e. g., a urea-formaldehyde, melamine-formaldehyde, polyvinyl formal, polyvinyl acetal or other resin.

Another advantage flowing from my invention is that it provides compositions which are especially suitable for use as impregnants for paper, textiles, and other porous bodies or structures with interstices. Thus, the polymerizable aldehyde-reaction products of this invention can be blended with one or more monomers which are copolymerizable therewith, numerous examples of which previously have been given, and the paper, textile or other porous material then can be treated with the blend, which preferably also contains a polymerization catalyst. The coated or coated and impregnated body is then heated to effect copolymerization in situ of the components of the blend and during which operation both addition and condensation polymerization reactions take place.

In some cases, instead of making a blend of the polymerizable aldehyde-reaction product with a monomer that is copolymerizable therewith in the manner described in the preceding paragraph, it may be desirable to carry out the reaction between the unsaturated guanamine and the aldehyde, specifically formaldehyde, in the presence of a comonomer which is capable of undergoing copolymerization with the unsaturated guanamine through the ethylenically unsaturated grouping attached to the 2-carbon atom of the triazine ring. In such a case, care should be taken that the copolymerization reaction does not proceed to the point where gelation takes place or a substantially insoluble resinous mass is obtained. This can be done by a suitable choice of the starting reactants and of the reaction conditions, including the temperature at which the reaction is carried out, the presence or absence of polymerization catalysts, inhibitors, solvents or diluents, etc.

In practicing my invention the initial condensation between the aldehyde and the unsaturated guanamine may be carried out at normal or at an elevated temperature, at atmospheric, subatmospheric or superatmospheric pressure, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or triamine, etc. Illustrative examples of acid condensation catalysts that may be employed in catalytic amounts are inorganic or organic acids, e. g., hydrochloric, sulfuric, phosphoric, formic (which is normally present in the aqueous formaldehyde employed), acetic, lactic, acrylic, phthalic, maleic, etc., or acid salts such as sodium acid sulfate, monosodium phosphate, monosodium phthalate, etc. If desired, mixtures of acids, of acid salts or of acids and acid salts may be employed in catalytic amounts in order to obtain acid conditions for the initial condensation reaction. Acid-addition salts of the unsaturated guanamine can be used instead of the latter itself as the starting reactant with the aldehyde.

The reaction between the aldehyde, e. g., formaldehyde, and the unsaturated guanamine may be carried out in the presence of solvents or diluents, other natural or synthetic bodies (numerous examples of which hereafter are given), or while admixed with other materials which are reactable or non-reactable with the aldehydic reactant or with the unsaturated guanamine, e. g., urea, thiourea, cyanamide, dicyandiamide, phthalic diamide, acetamide, chlorinated acetamides, methyl ethyl ketone, etc.; aldehyde-reactable triazinyl compounds other than the unsaturated guanamine used in practicing the present invention, e. g., melamine, ammeline, ammelide, etc.; phenol and substituted phenols, e. g., the cresols, the xylenols, the tert.-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerol, polyvinyl alcohol, etc.; amines, including aromatic amines, e. g., aniline, etc.; and the like.

The modifying reactants may be incorporated with the aldehyde and the unsaturated guanamine to form an intercondensation product by mixing all of the reactants and effecting condensation therebetween under acid, neutral or alkaline conditions or by various permutations of reactants. For example, I may effect partial reaction or condensation between the chosen aldehyde and the unsaturated guanamine, then add the modifying reactant, e. g., urea, melamine, etc., and effect further condensation. Or, I may first partially react urea, melamine or other aldehyde-reactable modifying reactant with a molecular excess of an aldehyde under acid, alkaline or neutral conditions, then add the unsaturated guanamine and effect further condensation. Or, I may separately partially react (1) urea, melamine or other aldehyde-reactable modifying reactant and an aldehyde and (2) an unsaturated guanamine of the kind embraced by the general formula given in the first paragraph of this specification and an aldehyde, thereafter mixing the two products of partial reaction and effecting further reaction or condensation therebetween. The reactants of (1) and (2) may be partially condensed under acid, alkaline or neutral conditions.

In producing these new reaction products of an aldehyde and an unsaturated guanamine of the kind with which this invention is concerned, the choice of the aldehyde is dependent largely upon economic considerations and upon the particular properties desired in the finished product. I prefer to use as the aldehydic reactant formaldehyde or compounds engendering formaldehyde, e. g., paraformaldehyde, trioxane, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, more particularly the mono- and polymethylol derivatives, of urea, thiourea and iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic, etc. Thus, instead of an aldehyde itself I can use, for example, a methylol urea, more particularly monomethylol urea or dimethylol urea or mixtures thereof, a methylol melamine, e. g., monomethylol melamine and polymethylol melamines (di-, tri-, tetra-, penta- and hexamethylol melamines). Mixtures of aldehydes and aldehyde-addition products can be employed, e. g., mixtures of formaldehyde and methylol compounds such, for instance, as dimethylol urea, trimethylol melamine, etc. When unsaturated aldehydes, e. g., acrolein methacrolein, etc., are employed as the aldehydic reactant, they may co-react with the unsaturated guanamine both through the amino groupings and through the ethylenically unsaturated grouping attached to the 2-carbon atom of the guanamine.

If desired, the reaction of the unsaturated guanamine with the aldehyde may be carried out in the presence of substances which inhibit vinyl-type polymerization reactions, e. g., polyhydric phenols and aromatic amines. More specific examples of polymerization inhibitors that may be employed are hydroquinone, resorcinol, tannin, sym.-di-(beta-naphthyl)-p-phenylene diamine, sulfur compounds, etc. The concentration of inhibitors, if used, is usually low, and less than about 1% by weight of the unsaturated guanamine is generally sufficient, and it may be as low, in some cases, as from 0.01% to about 0.1%.

The ratio of the aldehydic reactant to the unsaturated guanamine may be varied over a wide range depending, for example, upon the particular starting unsaturated guanamine and aldehyde employed and the particular properties desired in the finished product. Thus, the amount of starting aldehyde, e. g., formaldehyde, may be, for example, as low as 0.5 mole of aldehyde per mole of unsaturated guanamine to as high as 10 or 12 or more moles of aldehyde per mole of the unsaturated guanamine, more particularly from 1:1.05 to 1:2.5 (if, for example, one of the amino groupings of the guanamine is substituted) or 1:3 (if, for example, the amino groupings of the guanamine are unsubstituted). As is well known to those skilled in the art, the maximum amount of aldehyde, specifically formaldehyde, that can be combined with an amidogen compound (in this case, an unsaturated guanamine) by reaction through the amino groupings thereof is one mole of aldehyde for each hydrogen atom attached to the amino nitrogen atom. In the case of the unsaturated aldehydes, an additional mole or moles (as desired or as conditions may require) of aldehyde can react through the ethylenically unsaturated grouping attached to the 2-carbon atom of the guanamine.

The reaction between the aldehyde and the unsaturated guanamine can be effected under a wide range of pH conditions, as has been indicated hereinbefore, for example a pH of from about 1 or 2 to about 11, and more specifically a pH of from about 6 to about 9.

The temperature of the aldehyde-addition or condensation reaction with the unsaturated guanamine should be sufficiently high to ensure dissolution of the initial reaction product in the solvent employed. Generally, this minimum temperature is of the order of 60° C. The practical upper limit of the reaction temperature is the reflux temperature of the mixture when the reaction is carried out at atmospheric pressure. If higher pressures are employed, the temperature may be increased but, in general, reaction temperatures above about 200° C. should be avoided. The preferred temperature range is usually from about 90° C. to about 105° C.

The aldehyde-reaction products of this invention are especially suitable for use in the production of pulp preforms. When employed for this purpose, the unsaturated guanamine and the aldehyde, specifically formaldehyde, are caused to react at least to the point where, in finely powdered form, the reaction product will not coagulate or cake in water at about 20° C. This testing of the finely ground resin for absence of caking in water at 20° C. may be described as a "coagulation test", and the end point so determined as the "coagulation endpoint". Also, for pulp preform applications of the reaction or condensation product, the unsaturated guanamine and the aldehyde should not be reacted beyond the point where the condensation product has a plasticity of about 60 mils, as determined by the following test:

A charge of 50 grams of the material at 20°–30° C. is placed in the center of the bottom platen of a molding press, both platens of which are at a temperature of 290°±2° F. and which are so shaped and grooved as to produce a flat molded disc with concentric (annular) ridges, the first of which is 1½ inches from the center of the disc, and which are spaced ½ inch apart, and each of which is $\frac{3}{32}$ inch high, $\frac{1}{16}$ inch wide at the top and with the sides sloping inwardly toward the top at an angle of 30° from the perpendicular. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

The polymerizable aldehyde-reaction product may be used alone in such applications as have been mentioned hereinbefore, and then can be polymerized in situ to its ultimate form, with or without the aid of a polymerization catalyst, for instance an organic peroxide (e. g., benzoyl peroxide, acetyl peroxide, tert.-butyl hydroperoxide, etc.), an inorganic peroxide (e. g., hydrogen peroxide, etc.), a "redox" catalyst system (e. g., an ammonium persulfate-sodium metabisulfite system, etc.), and others which are known to the art. Or, in order to modify its properties and to widen the field of utility, it can be copolymerized with other substances which are different therefrom and copolymerizable therewith, e. g., compounds containing a $CH_2=C<$ grouping which are different from the aldehyde-reaction product of the unsaturated guanamine, unsaturated alkyd resins, mixtures of individual members of either or both of these classes of polymerizable unsaturated materials, as well as other copolymerizable substances.

The polymerization of the aldehyde-reaction product alone or while admixed with other unsaturated substances which are copolymerizable therewith is carried out by any of the various methods commonly used in effecting polymerization (including copolymerization) of other polymerizable and copolymerizable materials, for instance methods such as those described in Kropa Patent No. 2,510,503, dated June 6, 1950.

Illustrative examples of compounds that can be copolymerized with an aldehyde-reaction product of the unsaturated guanamine embraced by the general formula given in the first paragraph of this specification are compounds containing a $CH_2=C<$ grouping. Such compounds include the vinyl and alpha-substituted vinyl aromatic compounds, more particularly the vinyl and alpha-substituted vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl and alpha-substituted vinyl aromatic and aliphatic compounds, and other compounds containing a $CH_2=C<$ grouping, more particularly a single $CH_2=C<$ grouping. The unsaturated guanamines employed in practicing the present invention also can be used as comonomers with aldehyde-reaction products thereof to form a series of new and useful resinous materials.

Other examples of copolymerizable substances that can be employed alone or in conjunction with one or more compounds containing a $CH_2=C<$ grouping include the polymerizable unsaturated alkyd resins (modified or unmodified), e. g., ethylene glycol maleate, diethylene glycol maleate phthalate, ethylene glycol maleate succinate and diethylene glycol maleate linoleate.

Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of compounds that can be copolymerized with the new and useful aldehyde-reaction products of this invention are given in the aforesaid Kropa Patent No. 2,510,503 (e. g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The unsaturated alkyd resins used in practicing one embodiment of the present invention contain a plurality of polymerizably reactive alpha,beta-enal groups,

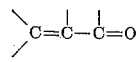

and are prepared in accordance with technique well known to those skilled in the resin art. Such resins are products of reaction of ingredients comprising a polyhydric alcohol and an unsaturated polycarboxylic acid, and are preferably produced by the esterification of an unsaturated alpha,beta-organic acid (or anhydride) of the aliphatic series, more particularly an unsaturated alpha,beta-polycarboxylic acid (or anhydride), with a polyhydric alcohol, for instance a glycol (e. g., diethylene glycol), glycerol, etc.

The proportions of the polymerizable aldehyde-reaction product and unsaturated material which is copolymerizable therewith may be widely varied depending, for instance, upon the particular starting materials employed and the particular properties desired in the copolymer, but usually are within the range of, by weight, from 1 to 5% of either to from 95 to 99% of the other, and more particularly from 10 to 15% of either to form 85 to 90% of the other. For many applications particularly good results are obtained with weight ratios of from 20:80 to 80:20. When the main function of the aldehyde-reaction product is to improve one or more specific properties of a substance which is copolymerizable therewith to form a copolymer, for example to improve the dyeability (especially toward acid dyes) of an acrylonitrile polymerization product, then the lower proportions of the aldehyde-reaction product are commonly employed, for instance weight ratios of aldehyde-reaction product and acrylonitrile (or equivalent monomer) of from about 1:20 of the former to about 99:80 of the latter.

Small amounts of the aldehyde-reaction products of this invention also may be used advantageously with a large amount of another monomer which ordinarily forms a thermoplastic linear polymer in order to obtain a copolymer having improved properties, e. g., a higher heat-distortion point, than that of the unmodified polymer. For example, from, by weight, about 0.2 to 2% of the aldehyde-reaction product may be mixed with about 98 to 99.8% of another monomer containing a single $CH_2=C<$ grouping, e. g., styrene (numerous examples of others have been given hereinbefore), and the mixture polymerized to form a copolymer in which some cross-linking has taken place and which has a higher heat-distortion than homopolymeric styrene having the same average molecular weight as the aforementioned copolymer.

In order that those skilled in the art may better understand how the present invention can be carried into effect the following examples are given by way of illustration and not by way of limitation. All parts and percentages are by weight.

*Example 1*

To a reaction vessel equipped with a reflux condenser are added 30 parts of methacryloguanamine, 30 parts of aqueous formaldehyde (approximately 37% HCHO) and 0.02 part of sodium hydroxide. The resulting slurry is heated on a steam bath, yielding almost immediately a methylol methacryloguanamine in solution and which comprises mainly dimethylol methacryloguanamine with a smaller or minor amount of monomethylol methacryloguanamine.

Heating is continued for 90 minutes, at the end of which time the product is a clear, viscous syrup containing partially polymerized (i. e., partially polymerized both by addition and condensation reactions) methylol methacryloguanamine. The water is removed by distillation, and the resulting fairly hard resin is cured at 150° C. On cooling, the cured methylol methacryloguanamine is a brittle, transparent resin.

*Example 2*

|  | Parts |
|---|---|
| Cinnamoguanamine | 42.6 |
| Aqueous formaldehyde (approx. 37% HCHO) | 44.0 |
| Sodium hydroxide | 0.02 | are charged to a reaction vessel equipped with a reflux condenser, which vessel is then heated on a steam bath for 2 hours. A methylol cinnamoguanamine is formed in solution, and it comprises mainly dimethylol cinnamoguanamine with a smaller or minor amount of monomethylol cinnamoguanamine. As in the previous example, some of the methylol derivative partially polymerizes during the heating period. The water is removed by distillation. After heating at 150° C. a balsam-like mass is obtained. Upon cooling, the product is a brittle, transparent resin.

*Example 3*

|  | Parts | Approx. Molar Ratio |
|---|---|---|
| Methacryloguanamine | 30.2 | 1.0 |
| Paraformaldehyde | 18.0 | 3.0 |
| n-Butyl alcohol | 126.0 | 8.5 |
| Phosphoric acid (85%) | 0.2 |  |

The mixture of the above ingredients is heated under reflux at the boiling temperature of the mass, yielding a viscous, syrupy resin. The syrup is filtered and a sample of it is cast as a film on a glass plate. The coated plate is heated for 15 minutes at 125° C. A hard, clear, baked coating or film is formed on the plate.

*Example 4*

A slurry containing 15.1 g. (0.10 mole) of methacryloguanamine and 24.3 g. (0.30 mole) of formalin (37% $CH_2O$) is adjusted to a pH of 8 by the addition of a few drops of N/2 NaOH. The mixture is heated on a steam bath. A clear solution forms within 3 to 4 minutes, and the solution remains clear during a heating period of 10 additional minutes. The solution is cooled (pH of 8.2 at this point), is diluted with 20 ml. of water and is stored at 5° C. for 3 days, during which time a heavy precipitate forms. The granular product, which comprises principally trimethylol methacryloguanamine with smaller amounts of the other methylol derivatives, is recovered by filtration, washed with ethanol and dried 3 to 4 hours in a vacuum oven at a maximum temperature of 80° C. Yield equals 18.8 g. (78% of theory).

*Example 5*

The procedure of Example 4 is followed except that shortly after the guanamine has gone into solution the liquid is poured into 50 ml. of cold ethyl alcohol, adjusted to a pH of 8 and filtered to remove a trace of insolubles. The solution is then concentrated on a steam bath, giving as a product 18 g. of syrup (21.5% volatiles by oven drying) plus about 2 g. of soft gel. The syrup is dilutable with monoethyl ether of ethylene glycol, water-alcohol mixtures, and dilute hydrochloric acid but not with water alone.

*Example 6*

A flask equipped with a reflux condenser is charged with—

6.4 g. "trimethylol methacryloguanamine" syrup of Example 5
5.0 g. butyl acrylate
10.0 g. monomethyl ether of ethylene glycol
0.10 ml. cumene hydroperoxide and is heated on a steam bath. The original clear solution begins to deposit a white gel after 15 minutes. After 38 minutes the product is a soft gel. It is removed, crushed with methanol, filtered, washed well with methanol and dried ½ hour at 70° C.

A disc 2" in diameter is molded from this product by pressing for 5 minutes at 155° C. and 16 tons total pressure. The molded piece is hard, fairly clear and light-colored.

*Example 7*

15.1 g. (0.1 mole) methacryloguanamine
38.4 g. (0.4 mole) furfural
5 ml. 0.5 N NaOH are heated together under reflux in a reaction vessel placed on a 200° C. oil bath for 17 minutes, after which 0.3 g. (0.1 mole) of paraformaldehyde is added, yielding a clear solution after heating for an additional 3 minutes. Heating under reflux is continued for an additional 85 minutes. Upon cooling, the aldehyde-reaction product separates as a tan-colored crystalline material which is filtered, washed with ethanol and dried in a desiccator; M. P. 169° C. The crystalline material resinifies upon heating it above its melting point for a short period of time.

*Example 8*

15.1 g. (0.1 mole) methacryloguanamine
17.6 g. (0.4 mole) acetaldehyde
32.7 g. ethyl alcohol are heated together under reflux for 15 minutes in a reaction vessel placed on a steam bath, after which 2 ml. of 5% HCl in ethanol is added and heating is continued for 15 minutes, yielding a solution having a blue haze. This solution becomes viscous and then sets to a soft gel after heating for an additional 10 minutes. This gel is heated in a thin layer at 100° C. for 30 minutes, forming a hard, clear, brittle resin. During the initial reaction period to soft-gel formation and subsequent heating of the gel in a thin layer, at least some of the ethyl alcohol co-reacts to form an ethylated methacryloguanamine-acetaldehyde reaction product.

*Example 9*

30.2 g. methacryloguanamine
48.6 g. formalin (approx. 37% $CH_2O$)

are mixed together to yield a slurry. A 0.5 N solution of NaOH is added to this slurry to adjust its pH to about 8, after which dilute acetic acid is added to reduce the pH to 7.05. The slurry is stirred in a closed reaction vessel for 18 hours, forming a clear solution in the interim. To the solution of the methacryloguanamine-formaldehyde reaction product comprising mainly trimethylol methacryloguanamine is added 10 ml. water, after which it is placed in a 5° C. refrigerator for 30 minutes; while in the refrigerator, the solution sets to a solid. It is removed from the refrigerator and warmed slightly to form a paste, filtered through a Büchner funnel to isolate the solid reaction product, which is then washed with ice water and dried in a vacuum desiccator. The yield of dried product is 45 g.; M. P. 98° C. It is soluble in hot water and in the monoethyl ether of ethylene glycol. This formaldehyde-reaction product of methacryloguanamine (mainly trimethylol methacryloguanamine) is used in forming various copolymers as described in examples which follow.

*Example 10*

| | Parts |
|---|---|
| Methacryloguanamine-formaldehyde reaction product of Example 9 | 10.0 |
| Mixture of (a) a polymerizable unsaturated alkyd resin produced by reaction of 6 moles propylene glycol, 4 moles phthalic anhydride and 2 moles fumaric acid and (b) styrene in the ratio of 60% of the former to 40% of the latter | 90.0 |
| Methyl ethyl ketone hydroperoxide (polymerization catalyst) | 0.5 |

The methacryloguanamine-formaldehyde reaction product is dissolved in the previously prepared mixture of the unsaturated alkyd resin and styrene by heating the mixed ingredients in a reaction vessel placed on a steam bath until solution has been effected, after which the polymerization catalyst is added. The resulting solution is clear, and forms a hard, clear, colorless copolymer of styrene, unsaturated alkyd resin and methacryloguanamine-formaldehyde reaction product upon heating the solution for 5 to 10 minutes at 90° C.

*Example 11*

Same as in Example 10 with the exception that 50 parts of the methacryloguanamine-formaldehyde reaction product and 50 parts of the mixture of the unsaturated alkyd resin and styrene are used instead of the proportions employed in Example 10. A hard, opaque, light-colored copolymer is obtained.

*Example 12*

| | Parts |
|---|---|
| Mixture of polymerizable unsaturated alkyd resin and styrene as in Example 10 | 50.0 |
| Solution of equal parts by weight of ethylene glycol monomethyl ether and methacryloguanamine-formaldehyde reaction product of Example 9 | 50.0 |
| Methyl ethyl ketone hydroperoxide | 2.5 |

The same procedure is followed as described under Example 10 with the exception that the solution is heated at 90°–125° C. until the ethylene glycol monomethyl ether has been removed and a hard, clear, colorless copolymer has been produced.

*Example 13*

| | Parts |
|---|---|
| Solution of 10% methacryloguanamine-formaldehyde reaction product of Example 9 and 90% ethylene glycol monomethyl ether | 50.0 |
| Mixture of (a) a polymerizable unsaturated alkyd resin produced by reaction of 6.6 moles propylene glycol, 2.0 moles phthalic anhydride and 4.0 moles maleic anhydride and (b) styrene in the ratio of 2 parts of the former to 1 part of the latter | 50.0 |
| Methyl ethyl ketone hydroperoxide | 2.5 |

Exactly the same procedure is followed as described under Example 12. The copolymer thereby produced has properties substantially the same as that of the copolymer of Example 12.

It will be understood, of course, by those skilled in the art that my invention is not limited to the specific ingredients named in the above illustrative examples nor to the particular proportions and conditions of reaction there given. Thus, instead of using the particular unsaturated material that is specified in certain of the examples as a co-reactant with the reactive reaction product of aldehyde and unsaturated guanamine, for instance butyl acrylate as in Example 6 and which is there used as a comonomer with the syrupy "trimethylol methacryloguanamine" (average of about three methylol groups per molecule) of Example 5 to produce a copolymer, I may use any other substance which is different from the aldehyde-reaction product and which is copolymerizable therewith, numerous examples of which have been given in the portion of this specification prior to the examples. As has been indicated hereinbefore, good results are obtained when, in producing such copolymers, the comonomer is a compound containing a $CH_2=C<$ grouping (e. g., a single $CH_2=C<$ grouping or a plurality of such groupings, for instance two or three $CH_2=C<$ groupings). Also, various catalysts may be added to accelerate the cure of the reactive aldehyde-reaction product, as desired or as conditions may require, among which may be mentioned for illustrative purposes acid or direct catalysts, for instance citric acid, phthalic anhydride, benzoic acid, salicylic acid, oxalic acid, etc.; latent curing catalysts (catalysts possessing latent acidity), e. g., ammonium chloride, monochloroacetyl urea, monochloroacetamide, o-sulfamidomethyl benzoate, etc.; as well as others. Good cures are usually obtained at a resin pH of about 3 to 6.

Other variations in the reaction procedures and conditions will be apparent from the foregoing description and from the examples that were given solely by way of illustration and which are not to be construed as limiting the scope of the invention. For instance, the preparation of a resin by simultaneous polymerization through the ethylenically unsaturated grouping and reaction of the aldehyde with the amino groups of the guanamine is not precluded, and can be done, for example, by carrying out the initial reaction between the aldehyde and the guanamine in the presence of a catalyst capable of functioning both as a condensation catalyst and a polymerization catalyst, or of both a condensation catalyst and a polymerization catalyst, numerous examples of which have been given hereinbefore.

As indicated hereinbefore and as further shown by some of the examples, the properties of the fundamental aldehyde-reaction products of this invention can be varied widely by introducing other modifying bodies before, during or after effecting reaction (partial or substantially complete reaction) between the primary components. Thus, as modifying agents I may use, for instance, monohydric alcohols, e. g., methyl, ethyl, propyl, isopropyl, butyl, hexyl, n-octyl, 2-ethylhexyl, decyl, dodecyl, cetyl, lauryl, capryl or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., succinamide, malonic diamide, maleic diamide, fumaric diamide, stearamide, acrylamide, benzamide, benzene sulfonamides, toluene sulfonamides, etc.; amines, e. g., ethylene diamine, phenylene diamine, triethylene tetramine, etc.; ketones, including halogenated ketone, e. g., methyl propyl ketone, acetone, chloroacetones, etc.; nitriles, including halogenated nitriles and unsaturated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetyl ureas, etc.

Illustrative examples of other modifying bodies that may be incorporated into the aldehyde-reaction products of this invention or into copolymers of such polymerizable products with other unsaturated materials that are copolymerizable therewith include melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with, for example, melamine-formaldehyde resins, urea-formaldehyde resins, fatty oil or fatty oil-acid modified alkyd resins, or other film-forming materials commonly used in protective-coating or decorative-surfacing compositions.

Dyes, pigments, driers, curing agents, plasticizers, mold lubricants, opacifiers and various fillers (e. g., wood flour, glass fibers, asbestos, mineral wool, mica dust, powdered quartz, titanium dioxide, talc, china clay, carbon black, etc.) may be compounded by conventional practice with the resinous materials of this invention, including those compositions which comprise a soluble, polymerizable, partial condensation product of an aldehyde, e. g., formaldehyde, and an unsaturated guanamine of the kind with which this invention is concerned, with or without one or more other unsaturated materials which are copolymerizable therewith, thereby to secure a coating, molding or other composition best adapted for a particular use.

The modified or unmodified synthetic materials, more particularly resinous compositions, of this invention have a wide variety of uses in addition to coating, molding and other applications. The soluble resins of my invention have a very wide range of solubility in organic solvents, including alcohols, ketones, esters, aromatic hydrocarbons and mineral spirits, and in solution state can be used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making plywood, as an impregnant of pulp pre-forms (a use that previously has been mentioned and for which certain products of this invention are especially suited), in electrical insulating and impregnating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon and other cellulose-containing textiles, wool, silk or other natural or synthetic proteinaceous textiles, including nylon and textiles derived from soya beans, etc., polyacrylonitrile fibers and textiles produced therefrom, in order to improve the properties of such textile materials and to make them more serviceable or useful.

I claim:

1. A polymerizable composition comprising (1) a polymerizable product of reaction of ingredients comprising (a) an aldehyde and (b) an amidogen compound represented by the general formula

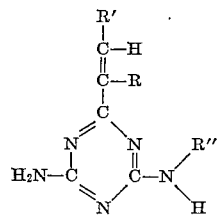

where R represents the methyl radical except when R' represents the phenyl radical in which case R represents hydrogen, R' represents a member of the class consisting of hydrogen and the phenyl radical, and R" represents a member of the class consisting of hydrogen and alkyl, aralkyl and aryl radicals, and (2) a substance which is different from the amidogen compound of (b) and from the reaction product of (1), which is copolymerizable therewith and which contains a $CH_2=C<$ grouping.

2. A polymerizable composition comprising (1) a polymerizable product of reaction of ingredients comprising (a) an aldehyde and (b) an amidogen compound represented by the general formula

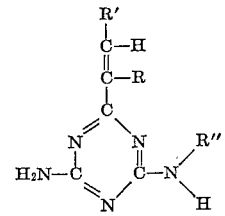

where R represents the methyl radical except when R' represents the phenyl radical in which case R represents hydrogen, R' represents a member of the class consisting of hydrogen and the phenyl radical, and R" represents a member of the class consisting of hydrogen and alkyl, aralkyl and aryl radicals, and (2) a vinyl aromatic compound.

3. A polymerizable composition as in claim 2 wherein the aldehyde of (a) is formaldehyde.

4. A polymerizable composition as in claim 2 wherein the amidogen compound of (b) is methacryloguanamine.

5. A polymerizable composition as in claim 2 wherein the amidogen compound of (b) is cinnamoguanamine.

6. A polymerizable composition as in claim 2 wherein the vinyl aromatic compound is styrene.

7. A product comprising the polymerized composition of claim 1.

8. A polymerizable composition comprising (1) a polymerizable product of reaction of ingredients comprising (a) an aldehyde and (b) an amidogen compound represented by the general formula

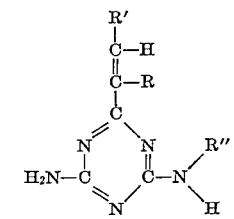

where R represents the methyl radical except when R' represents the phenyl radical in which case R represents hydrogen, R' represents a member of the class consisting of hydrogen and the phenyl radical, and R" represents a member of the class consisting of hydrogen and alkyl, aralkyl and aryl radicals, (2) an unsaturated alkyd resin containing a plurality of polymerizably reactive alpha,beta-enal groups, and (3) a substance which is different from the reaction product of (1) and which contains a $CH_2=C<$ grouping, the ingredients of (1), (2) and (3) being copolymerizable.

9. A polymerizable composition as in claim 8 wherein the substance of (3) is a vinyl aromatic compound.

10. A product comprising the polymerized composition of claim 8.

11. The method of preparing a new synthetic composition which comprises polymerizing, with the aid of a polymerization catalyst, a polymerizable composition comprising (1) a polymerizable product of reaction of ingredients comprising (a)

an aldehyde and (b) an amidogen compound represented by the general formula

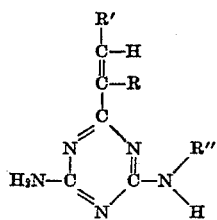

where R represents the methyl radical except when R' represents the phenyl radical in which case R represents hydrogen, R' represents a member of the class consisting of hydrogen and the phenyl radical, and R" represents a member of the class consisting of hydrogen and alkyl, aralkyl and aryl radicals, and (2) a substance which is different from the amidogen compounds of (b) and from the reaction product of (1), which is copolymerizable therewith and which contains a $CH_2=C<$ grouping.

References Cited in the file of this patent

UNITED STATES PATENTS

| Number | Name | Date |
|---|---|---|
| 2,197,357 | Widmer | Apr. 16, 1940 |
| 2,294,873 | D'Alelio | Sept. 1, 1942 |
| 2,309,624 | Bradley | Feb. 2, 1943 |
| 2,385,765 | Thurston | Sept. 25, 1945 |
| 2,461,943 | Thurston | Feb. 15, 1949 |
| 2,496,097 | Kropa | Jan. 31, 1950 |
| 2,527,314 | Mackay | Oct. 24, 1950 |

FOREIGN PATENTS

| Number | Country | Date |
|---|---|---|
| 266,377 | Switzerland | Apr. 17, 1950 |
| 930,681 | France | Aug. 18, 1947 |